United States Patent [19]

Dore

[11] 4,124,506
[45] Nov. 7, 1978

[54] METHOD FOR THE FILTRATION OF MOLTEN METAL IN A CRUCIBLE TYPE FURNACE

[75] Inventor: James E. Dore, Ballwin, Mo.

[73] Assignee: Swiss Aluminium Ltd., Chippis, Switzerland

[21] Appl. No.: 835,682

[22] Filed: Sep. 22, 1977

[51] Int. Cl.² ............................................. C22B 9/02
[52] U.S. Cl. ..................... 210/69; 75/68 R; 210/71
[58] Field of Search ................. 210/69, 71, 464, 455, 210/510; 75/68 R; 266/227, 238, 242, 275, 901

[56] References Cited

U.S. PATENT DOCUMENTS

| | | | |
|---|---|---|---|
| 133,720 | 12/1872 | Pettijohn | 210/510 |
| 2,359,386 | 10/1944 | Reinsch | 210/510 X |
| 3,729,097 | 4/1973 | Collins et al. | 210/69 |
| 3,843,355 | 10/1974 | Reding | 266/242 X |
| 3,962,081 | 6/1976 | Yarwood et al. | 210/69 |
| 4,024,056 | 5/1977 | Yarwood et al. | 210/69 |

*Primary Examiner*—William A. Cuchlinski, Jr.
*Attorney, Agent, or Firm*—Gregory P. LaPointe; Robert H. Bachman

[57] ABSTRACT

An improved method for the filtration of molten metal for use in the production of castings is disclosed in which a ladling crucible provided with a ceramic foam filter is inserted into a furnace crucible which is filled with molten metal so that the molten metal passes through the filter into the ladling crucible cavity so that oxide films and other impurities are removed prior to ladling.

14 Claims, 4 Drawing Figures

METHOD FOR THE FILTRATION OF MOLTEN METAL IN A CRUCIBLE TYPE FURNACE

BACKGROUND OF THE INVENTION

The present invention relates to the filtration of molten metal.

Molten metal, particularly molten aluminum, in practice generally contains entrained and dissolved impurities, both gaseous and solid, which are deleterious to the final cast product. The impurities may originate from several sources. For example, the impurities may include metallic impurities such as alkaline and alkaline earth metals, and occluded hydrogen gas and dissolved surface oxide films which have become broken up and are entrained in the molten metal. In addition, the inclusions may originate as insoluble impurities, such as carbides, borides and others or eroded furnace and trough refractories.

In typical sand, permanent mold and die casting foundries, it is common practice to use a pot or crucible type melting and holding furnace in capacity from 300 lbs to 1500 lbs of molten aluminum alloy. Depending on the type of operation, this furnace may be filled with the molten alloy from a larger furnace, or, the cold alloy may be added to the crucible furnace and melted therein. After the furnace is full of molten metal, it is common practice to treat the melt by fluxing with $Cl_2$, $N_2$, mixtures thereof, or $C_2Cl_6$ and an added additional grain refiner in the form of salts or a 5% Ti-1% B aluminum alloy hardener. The melt is then adjusted to the desired temperature and pouring of castings is allowed to begin.

Pouring is usually carried out with hand carried or manipulated ladles. The ladle is sized to hold slightly more metal than that required to pour one or more of the molds. The operator dips the ladle into the melt and fills it, wipes any skim from the melt surface and ladle lip and pours the molten metal into the molds. The residue of metal left in the ladle is dumped back into the parent melt in the furnace. Numerous pours are made in this manner until ½ to ⅔ of the molten metal has been cast. The repeated operation of bailing, pouring and dumping back results in the generation and entrainment of large quantities of oxide films and particulate in the parent melt.

The foundry alloy ingot used in preparing melts as described above are normally cast by a primary or secondary producer in an inline pigging machine. This operation involves the free fall of metal into the pig mold cavity. In addition, the melt treatment practices generally used in the production of the foundry alloy ingot are less than adequate. As a result, the ingot usually contains entrained oxide films and non-metallic particulate.

The oxides generated and entrained in the melt as described above can and often do produce defects in the resulting castings that are a cause for rejection. This is particularly true in specification type work for critical applications where the foundryman must meet specified radiographic standards.

The use of proper melt treatment and fluxing practices by the foundryman helps minimize inclusion problems. However, there is no method presently available for insuring that metal ladled from the crucible type furnace and poured into the mold is substantially free of undesirable non-metallics.

It is naturally highly desirable to filter the molten metal in the crucible type furnace in order to remove or minimize impurities in the final cast product especially, for example, when the resultant metal is to be used in a decorative product, such as decorative trim, or products bearing critical specifications, such as aircraft forgings and extrusions, and light gauge foil stock. Impurities as aforesaid cause loss of properties such as tensile strength and corrosion resistance in the final solidified alloy and lead to degradation of processing efficiency and loss of properties in the final cast product.

One conventional method of filtering in crucible type melting operations is disclosed in Volumn 3 of "Aluminum" published by American Society of Metals, 1967, page 35. This procedure requires the placing of a filter plate of porous refractories or carbon vertically in a crucible thereby dividing the crucible into two compartments, one for charging with molten metal and the other for ladling the molten metal. This procedure has a number of drawbacks, among them, the filter of porous refractories or carbon is not efficient in removing the aforesaid oxide films and non-metallic particulate. Furthermore, the system is not particularly efficient because due to the limited surface area of the filters employed, the system must be continually shut down in order to replace the filters. Finally, there is a problem in sealing the filter in the crucible so as to prevent leakage of the molten metal around the filtering system.

An alternative to the above crucible filtering techniques as set out above is diclosed in U.S. Pat. No. 3,729,097. This procedure requires placing a free floating member with an aperture at the bottom, which is covered with a glass cloth filter, in a molten metal thereby allowing the metal to float up through the filter into an inclosure where it is removed by a ladle. Again, this procedure suffers from a number of deficiencies, for example, the limited size of the filter requires that it be replaced frequently while the filter material itself is not efficient in removing oxide films and non-particulate impurities.

Porous ceramic foam materials are known to be particularly useful in filtering molten metal, as described in U.S. Pat. No. 3,893,917 for "Molten Metal Filter" by Michael J. Pryor and Thomas J. Gray, patented July 8, 1975 and also as described in U.S. Pat. No. 3,962,081 for "Ceramic Foam Filter" by John C. Yarwood, James E. Dore and Robert K. Preuss, both of which patents are assigned to the assignee of the present invention.

Porous ceramic foam materials are particularly useful for filtering molten metal for a variety of reasons included among which are their excellent filtration efficiency, low cost, ease of use and the ability to use same on a disposable, throwaway basis. The fact that these ceramic foam filters are convenient and inexpensive to prepare and may be used on a throwaway basis allows for the development of means for easily assembling and removing porous molten metal filters from a crucible type melting furnace while providing a highly efficient filtration assembly.

Accordingly, it is the principal object of the present invention to provide an improved method and apparatus for the filtration of molten metal in a crucible type melting furnace.

It is a particular object of the present invention to provide an improved removable filter means for use in the filtration of molten metal in a crucible type furnace.

It is still a further object of the present invention to provide improvements as aforesaid which are convenient and inexpensive to utilize and which result in high filtration efficiency.

Further objects and advantages of the present invention will appear hereinbelow.

SUMMARY OF THE INVENTION

In accordance with the present invention, it has been found that the foregoing objects and advantages may be readily obtained.

The present invention provides a highly efficient filtration assembly which utilizes a conveniently removable filter means. The removable filter means of the present invention is easily assembled and disassembled in the filtration assembly and enables one to obtain excellent filtration efficiency.

In accordance with the present invention, a crucible type furnace is provided with a rigid, readily replaceable filter means for the filtration of molten metal having an open cell structure characterized by a plurality of interconnected voids. The filter means is preferably a ceramic foam filter plate with interconnected voids being surrounded by a web of ceramic wherein said filter means is positioned in the crucible furnace so as to enable molten metal to pass through the filter means into an area which separates filtered metal from the non-filtered metal.

Accordingly, it is also seen that the present invention provides an improved apparatus for the filtration of molten metal in crucible type furnaces by providing a more efficient, readily replaceable, rigid filter assembly of greater surface area than heretofore known. The present invention, as indicated above, provides considerable advantages in the filtration of molten metal, especially aluminum. Thus, for example, the present invention enables one to filter molten metal in a crucible with a conveniently removable filter means which may be easily and quickly inserted in the filtration apparatus. In accordance with the preferred embodiment of the present invention, when a ceramic foam filter is utilized, extremely high filtration efficiencies are obtained and these efficiencies are obtained utilizing a disposable filter which can be readily inserted and removed from the filter apparatus.

DETAILED DESCRIPTION

FIGS. 1-4 illustrate the various embodiments of the present invention wherein a typical pot or crucible type furnace 1 is provided with a melting crucible 2 which contains the parent melt 3 of molten metal.

Figure 1:
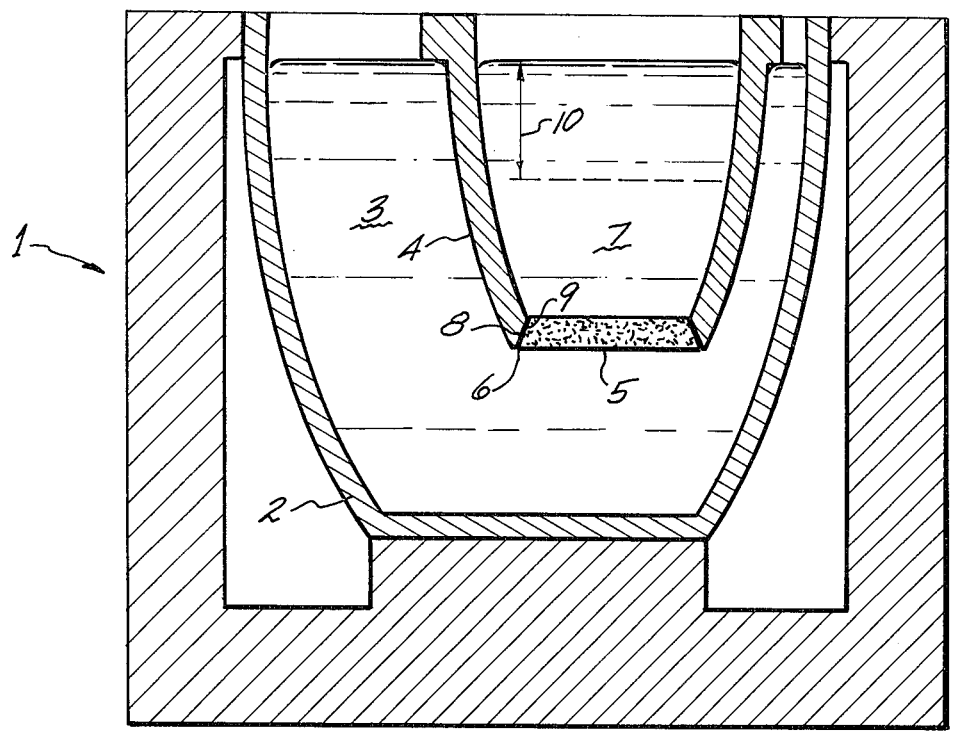
FIG. 1 is a side view of a first embodiment of the present invention.

FIG. 1 illustrates one embodiment of the present invention wherein filtration of the molten metal is accomplished by providing a free floating ladling crucible 4 with a ceramic foam filter element 5 in the bottom thereof which is appropriately sealed therein by means of seals 6. When the ladling crucible 4 with the filter element 5 sealed in place by seals 6 is immersed in the melt 3, the filter element 5 will prime and molten metal will flow through the filter element 5 into and fill the cavity 7 of the ladling crucible 4. As the molten metal passes through the filter element 5, substantially all of the entrained oxide films and non-metallic particulate are removed.

The bottom of ladling crucible 4 is provided with a circumferentially bevelled portion or aperture 8 extending around the periphery thereof which mates with a corresponding bevelled wall peripheral surface 9 of the filter element 5. The bevelled peripheral surface 9 of filter element 5 is provided with a resilient sealing means 6 thereon which is resistant to molten metal. The filter element 5 and sealing means 6 are inserted in the ladling crucible 4 so that the filter element sealing means assembly engages the bevelled wall surface of ladling crucible 4.

The ladling crucible 4 and filter element 5 may be of any convenient shape such as round, square, hexagonal or the like. The filter 5 is sealed in place by means of resilient seal 6 so that the filter element may be readily inserted and easily removed in the ladling crucible 4 by vertical pressure. Preferably, the bevelled peripheral surface of the ladling crucible 4 is bevelled at an angle of from 2° to 20° and the filter element is preferably provided with a bevelled surface 9 corresponding thereto at an angle of from 2° to 20°.

Since the filter element 5 of the present invention is designed to be a throwaway item, it is essential to provide an effective means of sealing the filter element 5 in place in the bottom of ladling crucible 4. It is preferred to seal the filter plate in place using a resilient seal means or gasket type seal 6 as illustrated in FIG. 1, which peripherally circumscribes the filter element at the bevelled portion thereof. The gasket type seal must be of a material that is resistant to molten aluminum alloys and resilient at elevated temperatures. Resiliency is required to make a metal tight seal between the filter element 5 and the ladling crucible 4 and hold the filter element securely in place. Typical seal materials include fibrous refractory type seals of a variety of compositions. Some typical seal compositions are, but not limited to: (1) a seal containing about 45% alumina, 52% silica, 1.3% ferric oxide and 1.7% titania; (2) a seal containing about 55% silica, 40.5% alumina, 4% chromia and 0.5% ferric oxide; and (3) a seal containing about 53% silica, 46% alumina and 1% ferric oxide.

The body of ladling crucible 4 may be made of dense graphite but may also be formed of other materials which are substantially unaffected by molten aluminum, provided that such material is less dense than molten aluminum. The weight of the ladling crucible 4 may be increased by means of an iron ring embedded in the graphite so as to be protected from contact by molten aluminum. The additional weight enables the filter element 5 to sink further into the molten metal, however, the necessity of the additional weight is usually not necessary.

In the preferred embodiment, filter element 5 is a ceramic foam filter as described in the aforesaid U.S. Pat. Nos. 3,893,917 and 3,962,081. In accordance with the teachings of the aforesaid patents, the ceramic foam filter has an open cell structure characterized by a plurality of interconnected voids surrounded by a web of ceramic material. The ceramic filter has an air permeability in the range of from 400 to 8,000 × $10^{-7}$ cm², preferably from 400 to 2,500 × $10^{-7}$ cm², a porosity or void fraction of 0.80 to 0.95 and from 5 to 45 pores per linear inch, preferably from 20 to 45 pores per linear inch. The molten metal flow rate through the filter should be 25 to 50 cubic inches per square inch of filter area per minute. The ceramic foam filter described in U.S. Pat. No. 3,962,081 is particularly suitable in the present invention since it is low cost and may be readily employed on a throwaway basis. Furthermore, this filter is surprisingly effective in the filtration of molten metal, especially aluminum, at a low cost achieving surprising filtration efficiency with considerable flexibility.

The ceramic foam filter may be prepared in accordance with the general procedure outlined in U.S. Pat. No. 3,893,917 wherein an aqueous ceramic slurry is prepared and the foam material impregnated therewith so that the web thereof is coated therewith and the voids substantially filled. The impregnated material is compressed so that a portion of the slurry is expelled therefrom and the balance uniformly distributed throughout the foam material. The coated foam material is then dried and heated to first burn out the flexible organic foam and then sinter the ceramic coating thereby providing a fused ceramic foam having a plurality of interconnected voids surrounded by a web of bonded or fused ceramic in the configuration of the flexible foam. Naturally, a wide variety of ceramic materials may be chosen depending upon the particular metal to be filtered. Preferably, a mixture of alumina and chromia is employed; however, these materials may naturally be utilized separately or in combination with other ceramic materials. Other typical ceramic materials which may be employed include zirconia, magnesia, titanium dioxide, silica and mixtures thereof. Normally, the slurry contains from about 10 to 40% of water and one or more rheological agents, binders, or air setting agents.

In operation, the molten metal which passes through the filter element 5 into the cavity 7 of the ladling crucible 4 is ladled from the cavity 7 for pouring the sand, permanent mold or die casting. Any residual molten metal remaining in the ladle after pouring the castings is then dumped back into the parent melt 3 into the furnace crucible 2. As the molten metal is ladled from the cavity 7 of the ladling crucible 4, a difference in the metallostatic head or metal level 10 is created between the molten metal 3 in the furnace crucible 2 and the ladling crucible 4. This difference in metallostatic head 10 causes molten metal to flow through the filter element 5 and equalize the molten metal level 10 in the furnace crucible 2 and the ladling crucible 4. In this fashion, additional metal is filtered for the pouring of castings.

Ladling of metal from the ladle crucible 4 for pouring or casting can proceed until the overall metal level 10 and the ladling crucible cavity 7 drops to a point where the ladle can no longer be filled. By proceeding in this fashion, as described above, only filtered molten metal substantially free of oxide films and particulate is ladled and poured into the casting molds.

Several modes of operation, namely, semi-continuous, or batch type may be employed with the present invention.

In the semi-continuous operation, the furnace crucible 2 would be filled with molten metal 3 with a larger holding furnace, the pre-heated ladling crucible 4 inserted in the melt, and ladling in casting started. When the melt 3 in the furnace crucible 2 reaches a predetermined minimum level, the furnace crucible 2 would be refilled with molten metal 3 from the larger holding furnace and casting would be resumed. This cycle would be continued several times until (1) the furnace was shut down at the end of the day, or (2) plugging of the filter excessively delayed refilling of the ladling crucible between pours. The semi-continuous operation requires that melt treatment, i.e., degassing, and the addition of grain refiners be carried out in the larger holding furnace prior to transfer of the molten metal to the crucible furnace 2.

In a typical batch type operation the aluminum alloy pig would be charged to and melted in the furnace crucible 2. Once the molten grain refiners are added, the melt is degassed and the surface thereof skimmed. The preheated ladling crucible 4 with the filter element 5 would then be inserted into the melt 3. Casting would proceed until the melt level 10 in the furnace crucible 2 reached a minimum level. At this time casting would be stopped, the ladling crucible 4 removed and the above cycle repeated. With the batch type operation it will be necessary to insert a new filter element 5 in the ladling crucible 4 after each run. It is expected that the ladling crucible 4 itself would last for a number of casting runs.

The filter element and ladling crucible design of the present invention offer significant improvements over other filtration methods heretofore known. The use of ceramic foam as a filter element results in superior effective filtration of the molten metal over previously known filter materials. The mating bevelled portions of the filter element and the ladling crucible allow for easy and effective insertion and removal of the filter element. Since the filter element of the present invention is designed to be a throwaway item, it is essential that the element be readily inserted and removed from the ladling crucible while maintaining an effective seal between the bevelled faces of the aforesaid elements.

Figure 2:
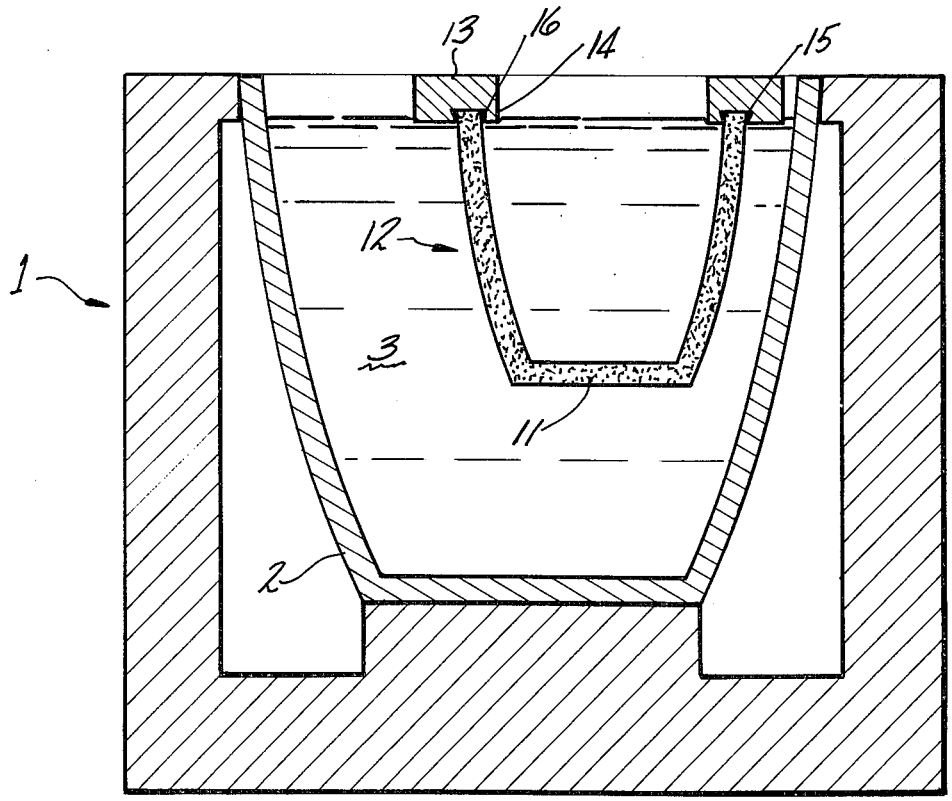
FIG. 2 is a second embodiment of the present invention.

An alternative form of a ladling crucible and filter assembly is shown in FIG. 2. In this case, the ceramic foam filter element 11 makes up substantially the total surface area of the ladling crucible 12. A free floating ring 13, which may be formed of graphite or other suitable material, is provided with a circumferential bevelled surface 14 similar to that described in the previous embodiment of FIG. 1. The ceramic foam filter element 11 is provided with a corresponding mating bevelled peripheral surface 15 which mates with the aforesaid bevelled surface on free floating ring 13. Appropriate seal means 16 is provided on the bevelled surface of filter element 11 in the same manner as previously described for the embodiment of FIG. 1. Thus, the ceramic foam filter is readily replaceable within the ring member in the same manner as described in the previous embodiment. Furthermore, the filter and crucible assembly may be of any given shape such as round, square, hexagonal or the like. The mode of operation in this embodiment is the same as previously described above.

The embodiment of FIG. 2 has certain advantages over that of FIG. 1 and the prior art, the primary advantage being a substantial increase in the surface area of filter medium. By employing ceramic foam material for the filter element in the embodiment of FIG. 2, a sturdy rigid structure is obtained which could not be accomplished by using previously known glass cloth filters.

Figure 3:
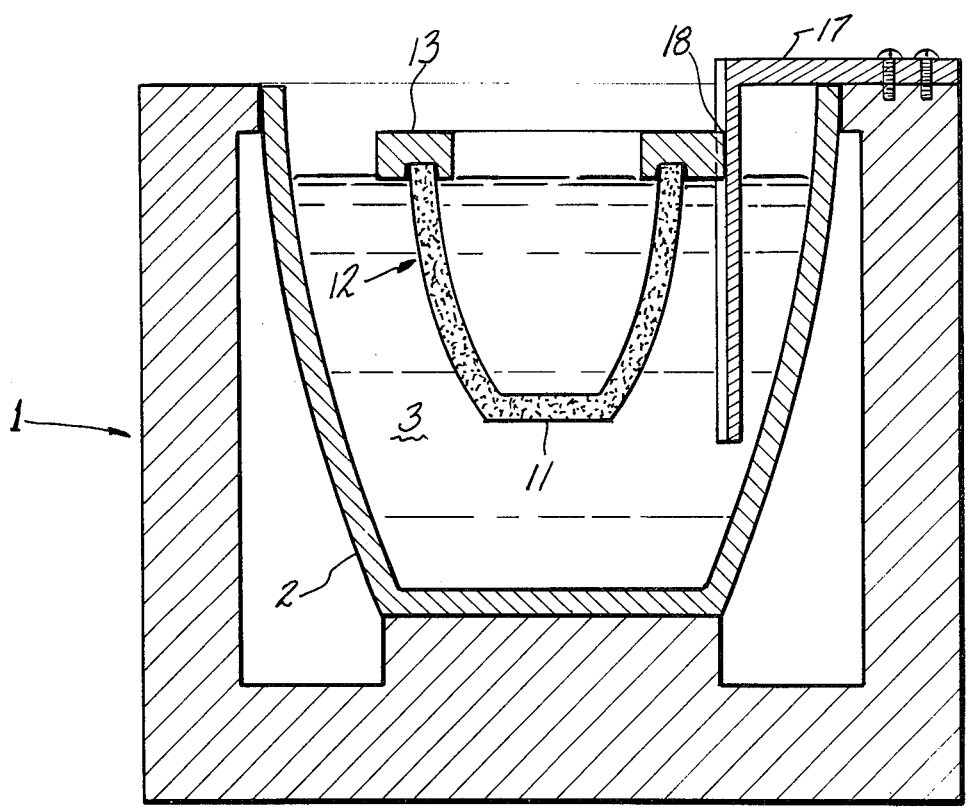
FIG. 3 is a third embodiment of the present invention.

A third embodiment of the present invention is illustrated in FIG. 3. The filter and ladle crucible assembly is indentical to that set forth for the embodiment of FIG. 2. As can be seen from FIG. 3, the ladle crucible assembly is not allowed to free float but rather is freely slidable and supported for vertical movement on support structure 17. Ring 13 is provided with track 18 which mates with a like track on support 17. As the level of molten metal in the furnace crucible 2 is diminished, the ladling crucible and filter assembly 12 will slide down the support 17 to the appropriate level. This embodiment is advantageous in that there is no danger that during the ladling operation the ladling crucible may be tipped over.

An additional embodiment of the ladling crucible, not illustrated, may be formed with only the side walls of the ladling crucible being made of ceramic foam while the bottom and top ring of the crucible are made of graphite or other suitable material as previously disclosed.

Figure 4:
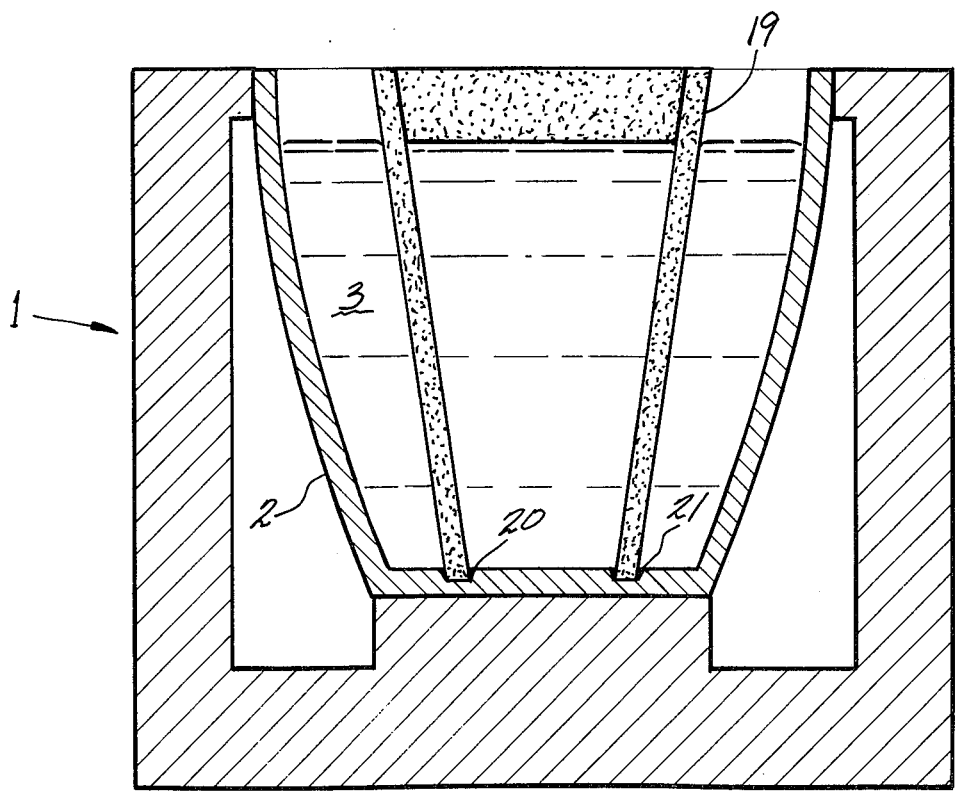
FIG. 4 is a forth embodiment of the present invention.

A further embodiment of the present invention is illustrated in FIG. 4. As can be seen with respect to FIG. 4, a ceramic foam filter 19 acts as both the filter and ladling crucible. The filter in FIG. 4 is illustrated as a truncated cone, however, it may be any appropriate shape such as rectangular, cylindrical or the like. The base of furnace crucible 2 is provided with a cut out groove 20 in the same shape as that of filter element 19. The bottom of filter element 19 is provided with seals 21 of the type previously described. The base of filter element 19 is fitted into the corresponding mating groove 20 in the base of furnace crucible 2 and sealed therein by the seals 21. The filter and groove are bevelled in the same manner as previously described. Again, as is the case in the previous embodiments, the filter element 19 is readily replaceable within the furnace crucible 2. This embodiment has a number of advantages over the previously described prior art. Firstly, the surface area of the filter element is greatly improved. In addition, the rigid structure of the filter element would prevent any tipping of the crucible which otherwise might occur. Finally, the embodiment of FIG. 4 eliminates the need for any graphite crucible member which would normally have to be replaced due to wear.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In the filtration of molten metal with a removable filter plate the method which comprises:
   providing a furnace crucible having means to charge said furnace crucible with molten metal;
   providing a ladling crucible means comprising a filter element having an open cell structure characterized by a plurality of interconnected voids;
   inserting said ladling crucible means in said furnace crucible wherein said ladling crucible slides on a support; and
   charging said furnace crucible with molten metal wherein said molten metal passes from said furnace crucible through said filter element into said ladling crucible, thereby removing impurities from the molten metal.

2. The method of claim 1 wherein said filter element is in the form of a ceramic foam filter.

3. The method of claim 2 wherein said ceramic foam filter element has an air permeability in the range of 400 to 8,000 × $10^{-7}$ cm$^2$, a porosity of 0.80 to 0.95 and a pore size of 5 to 45 pores per linear inch.

4. In the filtration of molten metal with a removable filter plate the method which comprises:
   providing a furnace crucible having means to charge said furnace crucible with molten metal;
   providing a ladling crucible means comprising a member having an open top, side walls, and a bottom;
   forming said open top of an imperforated material which is substantially unaffected by said molten metal;
   providing said open top with a bevelled peripheral surface adapted to receive said side walls of said ladling crucible means;
   forming said ladling crucible means in part of an element having an open cell structure characterized by a plurality of interconnected voids;
   inserting said ladling crucible means in said furnace crucible; and
   charging said furnace crucible with molten metal wherein said molten metal passes from said furnace crucible through said filter element into said ladling crucible, thereby removing impurities from the molten metal.

5. The method of claim 4 wherein said side walls are formed with a bevelled peripheral surface adapted to mate with said bevelled surface of said open top and including a resilient sealing means on said bevelled surface of said side walls.

6. The method of claim 5 wherein said ladling crucible means is adapted to slide on a support within said furnace crucible.

7. The method of claim 6 wherein said element is a ceramic foam filter.

8. The method of claim 7 wherein said ceramic foam filter has an air permeability in the range of 400 to 8,000 × $10^{-7}$ cm$^2$, a porosity of 0.80 to 0.95 and a pore size of 5 to 45 pores per linear inch.

9. In the filtration of molten metal with a removable filter plate the method which comprises:
   providing a furnace crucible having means to charge said furnace crucible with molten metal;
   providing a ladling crucible means comprising a filter element having an open cell structure characterized by a plurality of interconnected voids;
   providing said furnace crucible with a surface adapted to receive said ladling crucible means; and
   charging said furnace crucible with molten metal wherein said molten metal passes from said furnace crucible through said filter element into said ladling crucible, thereby removing impurities from the molten metal.

10. The method of claim 9 wherein said furnace crucible comprises a base wherein said base is formed with a groove having a bevelled side wall surface adapted to receive said ladling crucible means.

11. The method of claim 10 wherein said ladling crucible means is provided with a bevelled peripheral surface adapted to removably mate with said bevelled surface of said groove in said base.

12. The method of claim 11 wherein said ladling crucible means is formed of a hollow enclosure wherein the interior of said hollow enclosure forms said ladling compartment.

13. The method of claim 12 wherein said filter element is ceramic foam.

14. The method of claim 13 wherein said ceramic foam material has an air permeability in the range of 400 to 8,000 × $10^{-7}$ cm$^2$, a porosity of 0.80 to 0.95 and a pore size of 5 to 45 pores per linear inch.

* * * * *